United States Patent [19]
Mollere

[11] 4,117,780
[45] Oct. 3, 1978

[54] LINEAR EJECTION UNDERWATER CHARGE LAUNCHER

[75] Inventor: John C. Mollere, Nassau Bay, Tex.

[73] Assignee: Western Geophysical Co. of America, Houston, Tex.

[21] Appl. No.: 805,267

[22] Filed: Jun. 10, 1977

[51] Int. Cl.² ............................................. G01V 1/08
[52] U.S. Cl. .................................. 102/22 R; 181/116; 181/118
[58] Field of Search .................................. 102/22-24; 181/116, 118

[56] References Cited

U.S. PATENT DOCUMENTS

| | | | |
|---|---|---|---|
| 3,574,298 | 4/1971 | Larson | 102/22 |
| 3,601,052 | 8/1971 | Mollere | 102/22 |
| 3,968,855 | 1/1975 | Mollere | 181/118 |

Primary Examiner—Verlin R. Pendegrass
Attorney, Agent, or Firm—William A. Knox

[57] ABSTRACT

The underwater charge launcher linearly ejects a small, water-propelled explosive charge into the water from the open end of an ejection barrel trailed in the water behind a seismic exploration vessel. The charge is detonated, after a one to two-second delay, when a percussion-ignitable delay cap in the end of the charge impacts a firing member positioned adjacent the open end of the ejection barrel. The firing member includes a firing pin mounted on a rotatable, spring-biased striker plate having a U-shaped rim. When a charge is ejected from the barrel, the primer cap impacts the firing pin. The kinetic force of the ejected charge acting against the firing pin overcomes the moment of inertia of the striker plate, causing it to rotate the firing pin out of the path of the charge. The charge is supported and guided by the unobstructed portion of the U-shaped rim of the striker, as the charge is ejected out of the launcher. After a preset delay, the charge detonates when it is a safe distance from the launcher. Once the charge is clear of the firing member, a bias spring returns the striker plate to its rest position.

8 Claims, 5 Drawing Figures

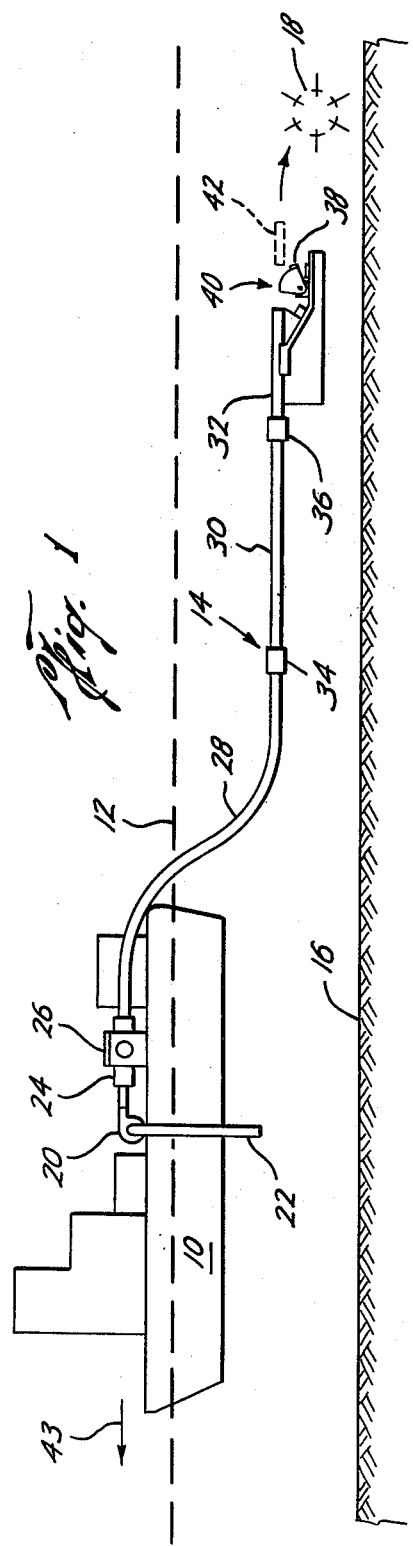
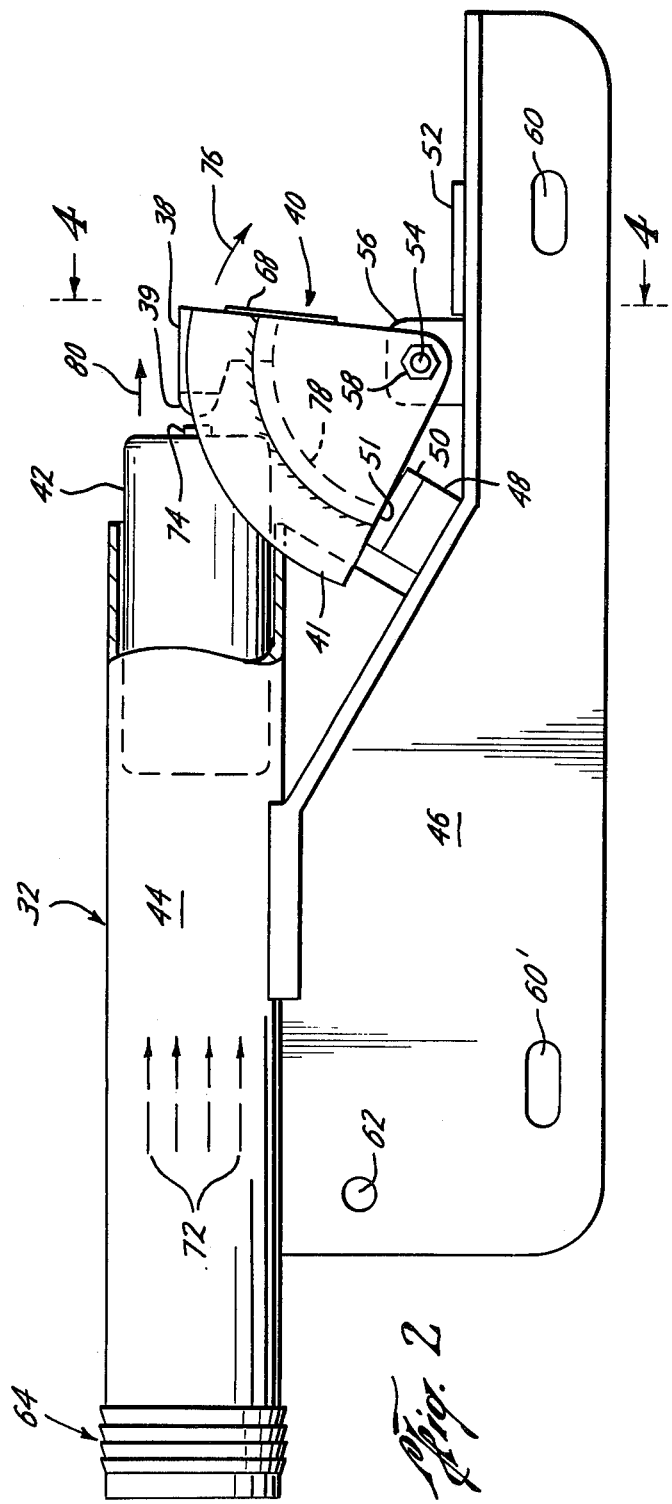

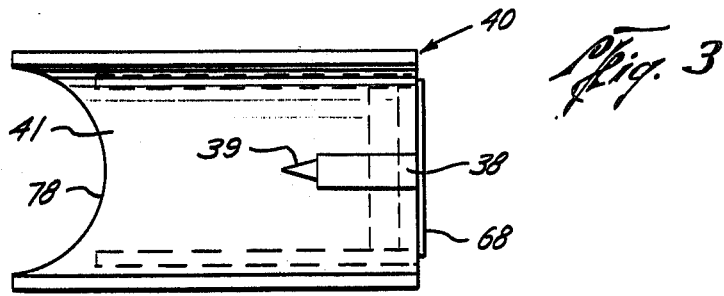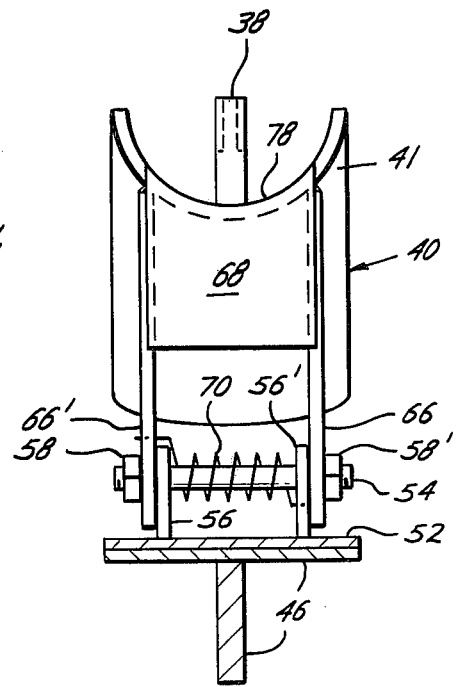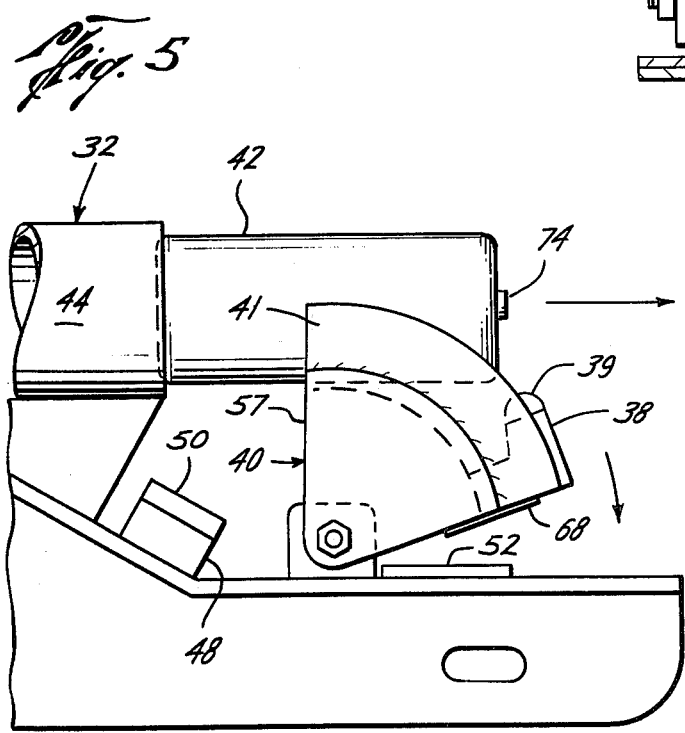

LINEAR EJECTION UNDERWATER CHARGE LAUNCHER

BACKGROUND OF THE INVENTION

1. Field of the Invention

This invention relates generally to marine seismic energy sources and more particularly to use of small explosive charges, fired by percussion, at short time intervals.

2. Description of the Prior Art

There are a number of known seismic exploration systems for launching small explosive charges into the water from a seismic exploration ship. Typically, a launcher assembly consists of a long, large-diameter flexible hose, one end of which is attached to a high volume water pump on the ship. To the other end of the hose is attached an accelerator barrel which is, in turn, coupled to a detonator device. The detonator device has rigidly mounted percussion element or firing pin on one end and an ejection window cut into one side between the firing pin and the acceleration barrel. The hose, acceleration barrel, and detonator device are towed beneath the water surface by the seismic ship at a convenient speed of four to six knots.

Explosive cartridges are provided. The cartridge consists of a can or a cardboard cylinder containing an explosive such as Nitro-Carbo-Nitrate (NCN) and a primer. A cylindrical well is provided at one end of the cartridge into which a rim-fire percussion cap, having a delay fuse, may be embedded to arm the charge.

In operation, the pump directs a high-volume stream of water through the attached launcher assembly. The armed cartridge is inserted into the water stream by means of a suitable loading device, cap-end first. The cartridge is flushed through the hose to the acceleration barrel whence it emerges into the detonator device at high velocity. The momentum of the cartridge causes the cap in the end of the cartridge to strike the firing pin, igniting the delay fuse. At the same time, the force of the water stream nudges the trailing end of the cartridge out of the lateral ejection window of the detonator device, end-over-end. The cap delay is one or two seconds to provide sufficient time for the ship to tow the launcher a safe distance away from the exploding cartridge when the delay fuse times out.

A description of the cartridge and delay fuse is disclosed in U.S. Pat. No. 3,574,298 in conjunction with FIGS. 2-2d of the patent. Several versions of a detonator device or "gun" are shown FIGS. 1, 3, 6, and 7. Improved versions of the same gun are disclosed in U.S. Pat. No. 3,601,052 FIGS. 1-5 and U.S. Pat. No. 3,968,855, FIG. 2. FIG. 2 of the latter patent also illustrates the details of an acceleration barrel. FIGS. 3 and 4 of U.S. Pat. No. 3,601,052 disclose an improved means for nudging the cartridge out of the ejection window of the gun.

Basically, in all of the commercially successful prior art devices discussed, the cartridge strikes a rigid firing pin and is ejected sideways from the detonator device. Small charges on the order of a half-pound of explosive are conveniently enclosed in small metal cartridges which have sufficient rigidity and a small enough mass so that they are not deformed when the cartridge strikes the rigid firing pin. Larger charges, of 6 to 8 pounds, are most conveniently enclosed in elongated cardboard tubes. Because of the considerably larger mass, the cardboard-enclosed charges disintegrate when they abruptly impact the rigid firing pin. Premature detonations result, destroying the launcher assembly.

The second disadvantage of the above-cited devices is the sideways ejection of the cartridges. It is not unusual for the charge to remain unejected with consequent premature detonation. Known causes for such non-ejection are a drop in pressure of the cartridge-flushing water stream and entanglement of the gun ejection window by underwater debris, weeds or the like. It would be preferable to linearly eject the cartridge from an open-ended detonator device and to provide a rotatable firing pin assembly which would remove itself from the pathway of the cartridge after the delay fuse has been ignited.

FIGS. 6-6b of U.S. Pat. No. 3,574,298 illustrate one such embodiment. A spring loaded firing pin assembly 86 is mounted on the open end of gun 84. When the cap in the forward end of cartridge 4' strikes knife edge 98, the delay fuse is ignited. The knife edge thereafter moves upwards and slides across the side of cartridge 4' which is supposed to be ejected linearly from the open end of the gun. The device is unsatisfactory for three reasons. First, in commercial use, the firing pin assembly 86 was found to have an insufficient moment of inertia to reliably ignite the cap. As is well known, a substantial impactive force is required to detonate a rim-fire percussion cap. Second, the edge 98 of the blade 86' under the urging of the spring 96 exerts pressure on and cuts the side of the casing of cartridge 4', thereby disabling the charge. Third, the downward force of the spring-loaded blade against the side of the cartridge tends to misalign the cartridge with respect to the logitudinal axis of the gun 84 as the cartridge emerges. Hangups occur, resulting in premature detonation and destruction of the gun.

SUMMARY OF THE INVENTION

It is an object of this invention to provide an underwater charge launcher system including a gun for linearly ejecting an explosive cartridge into the water. The launcher includes an acceleration barrel and a detonator assembly consisting of a cartridge ejection barrel, a firing pin, a rotatable means for removing the firing pin from the path of the ejected cartridge, and a means for supporting and guiding the ejected cartridge until the cartridge is clear of the gun.

In a preferred embodiment, the detonator assembly consists of an elongated ejection barrel and a striker plate having the shape of a circular sector with a U-shaped rim. The inside radius of the U-shaped rim is slightly larger than the outer radius of a cartridge. Inner and outer faces of the striker plate are defined by radial planes perpendicular to the rim, the intersection of which defines a pivot point. The striker plate is pivotally mounted on a support beneath the ejection barrel. The pivotal axis is perpendicular to the longitudinal axis of the barrel and is located beneath the ejection barrel so that the U-shaped rim of the sector forms a smooth extension of the lower half of the ejection barrel. In the rest position, a helical bias spring urges the inner face of the striker against a stop and positions the outer face parallel to the open end of the acceleration barrel. A firing pin is secured to the striker adjacent the outer face, centered with respect to the U, and facing inwards towards the ejection barrel. An armed cartridge is flushed down the launcher system cap end first. As the cap impacts the firing pin, the cartridge gives up some of its kinetic energy to overcome the moment of inertia of the striker plate. The impact causes the striker plate to rotate the firing pin out of the path of the cartridge which, cradled by the U-shaped rim of the striker plate, is ejected longitudinally from the gun.

BRIEF DESCRIPTION OF THE DRAWINGS

These and other beneficial features of this invention will be more fully understood by reference to the following description and to the figures wherein:

FIG. 1 is a showing of a seismic exploration ship towing an underwater charge launcher;

FIG. 2 shows the details of the gun and detonator assembly;

FIG. 3 is a top view of the striker plate of FIG. 2;

FIG. 4 is a section along line 4—4' of FIG. 2; and

FIG. 5 shows a portion of the right hand half of the gun and illustrates the reaction of the striker plate in response to the impact of an emerging cartridge.

DETAILED DESCRIPTION OF THE PREFERRED EMBODIMENT

In FIG. 1, a seismic exploration ship 10 steams over a body of water 12, towing an underwater charge launcher generally shown as 14. The ship also tows a streamer cable (not shown) containing hydrophones to receive acoustic signals reflected from earth layers beneath the water bottom 16. Acoustic reflections are generated by an explosion 18 of a small charge of explosive material such as NCN.

Charge launcher 14 includes a water pump 20 having an intake 22 and an outlet 24. An explosive charge, armed with a percussion cap, is loaded into loader 26 and is flushed down hose 28 by the water stream furnished by pump 20. Hose 28 is coupled to an acceleration barrel 30 and a detonator device or gun 32 by suitable couplings 34 and 36 respectively. Flushed through hose 28, the charge is accelerated in acceleration barrel 30 into detonator 32. Emerging from detonator 32 the percussion delay cap in the charge strikes firing pin 38 secured to a rotatable striker plate or mass 40. The kinetic energy of the charge impacting firing pin 38 causes the attached striker plate to roll into the position shown and the charge 42 (dotted lines) is ejected linearly out of the charge launcher 14. When the percussion cap (not shown) first impacts firing pin 38, a delay fuse in the cap is ignited. After one or two seconds delay, the charge explodes as shown at 18. In the meantime ship 10 has moved away, down the line of survey in the direction shown by arrow 43, moving charge launcher 14 a safe distance away from explosion 18.

The detonator or gun 32 is shown in detail in FIG. 2. The gun consists of ejector barrel 44, support bracket 46, rotatable striker plate 40, firing pin 38, interior stop 48 having a hard rubber bumper 50, exterior stop 52, pivot rod 54, pivot rod bracket 56, 56', and retaining nuts 58, 58' Slots 60, 60' are provided in support bracket 46 to provide attachment points for depressor weights (not shown). A hole 62 is drilled into support bracket 46 for attachment to a tow line. Corrugations 64 are cut at the left hand end of ejection barrel 44 for connection to a hose (not shown). Ejection barrel 44, about 3.5 inches in diameter and about two feet long, is welded to support bracket 46 by well known means.

Striker plate 40 is in the shape of a circular sector having a concave or U-shaped, outer rim 41. FIG. 3 is a top view of striker plate 40, showing the contour of the U-shaped rim. The inside radius of the U is about 1⅝ inches, sufficient to accomodate cylindrical explosive cartridge 42. A firing pin 38 is welded to the outer face of the striker plate rim. The inner edge 39 of firing pin 38 is a semi-circular, blunt edge of hardened steel.

FIG. 4 is an end view of the striker plate assembly taken along section 4—4' of FIG. 2. The U-shaped rim 41 is fabricated by cutting off the lower half of a 3.5 inch "weld-ell" commonly used with welded pipe lines. The rim is welded to supports 66, 66' and braced by an outer face or backing plate 68. The striker plate assembly 40 is pivotally mounted perpendicular to the long axis of the ejector barrel by pivot rod 54 mounted on pivot support bracket 56 and is held in place by hexagonal retaining nuts 58. The pivot support brackets are of course welded to support bracket 46, just ahead of exterior stop 52. When at rest and not in operation, the inner face 51 of striker plate 40 is urged against bumper 50 mounted on interior stop 48 (FIG. 2) by bias spring 70. Striker plate 40 is constructed to have as much weight as possible concentrated around its rim to provide a maximum moment of inertia to firing pin 38.

In operation, referring to FIGS. 2 and 5, a cylindrical cartridge 42 is flushed into ejection barrel 44 under the impetus of a water stream shown symbolically by stream lines 72. Cartridge 42 reaches a velocity of up to 20 feet per second (about 13mph) and for a 5-pound charge the kinetic energy is about 62.5 foot-pounds. Cartridge 42 is primed by a cap 74. Although cap 74 is for clarity, shown projecting from the front of cartridge 42, it is to be understood that in a preferred embodiment, the cap is recessed inside the leading edge of the cartridge. As cartridge 42 is ejected from ejection barrel 44, cap 74 impacts firing pin 38, igniting the delay fuse in the cap. Upon impact, cartridge 42 gives up some of its kinetic energy to overcome the moment of inertia of striker plate 40 and accordingly forces the striker plate to rotate as shown by the curved arrow 76. In the meantime, the cartridge, supported by the bottom 78 of the U-shaped rim 41, continues its linear motion outwards as shown by arrow 80. Referring to FIG. 5, as cartridge 42 is further ejected linearly outwards, it forces firing pin 38 out of the way when striker plate 40, rotates clockwise as shown, against exterior stop 52. At the same time, the cartridge is cradled and guided by the channel formed by U-shaped rim 41. Although inner edge 39 of firing pin 38 may bear against the side of cartridge 42 the cartridge emerges, the edge is too blunt to damage the cartridge case. Because the entire gun assembly is being towed through the water, hydrodynamic drag tends to hold striker plate 40 open mementarily for a short dwell period, long enough for the cartridge to escape linearly into the ambient body of water. After cartridge 42 is clear of launcher assembly 32, bias spring 70 urges striker plate to rotate counterclockwise back against bumper 50 the rest position. Although a spiral spring 70 is illustrated in FIG. 4, it would be obvious to substitue a conventional extension spring as is well known in the mechanical arts.

I claim as my invention:

1. In a ship-towed underwater charge launcher for ejecting cylindrical explosive cartridges into a body of water along a linear path for use in seismic exploration, said explosive cartridge being armed by a percussion-ignitable delay cap embedded therein and being propelled by water pressure from said towing ship, through a flexible hose, one end being attached to said ship, the other end trailing in the water, a detonator gun coupled to the trailing end of said hose, the detonator gun comprising:

an elongated cylindrical ejection barrel, having one end open to the water, for receiving an armed explosive cartridge from said flexible hose and for ejecting said cartridge into said body of water;

a rotatable, striker plate assembly, having a U-shaped rim, positioned adjacent the open end of said ejection barrel; and a firing pin secured to said striker plate assembly for receiving the impact of said embedded percussion cap when said armed explosive cartridge first emerges from said ejection barrel.

2. The detonator gun as defined by claim 1 wherein:
said striker plate is in the shape of a circular sector and its axis of rotation is perpendicular to the logitudinal axis of said ejection barrel.

3. The detonator gun as defined by claim 2 wherein:
said water-propelled cartridge imparts some of its kinetic energy to said striker plate assembly through said firing pin to overcome the moment of inertia of said striker plate assembly thereby to cause said striker plate to rotate said firing pin out of the travel path of said water propelled charge.

4. The detonator assembly as defined by claim 3 wherein:
the U-shaped rim of said striker plate assembly cradles and guides said water-propelled cartridge along a linear path into the body of water after said cartridge has emerged from said ejection barrel.

5. The detonator assembly as defined by claim 3 wherein:
hydrodynamic drag against said striker plate assembly, when under tow, causes said striker plate to dwell momentarily in the rotated position while said ejected cartridge clears the detonator gun.

6. The detonator gun as defined by claim 3 including:
resilient means coupled to said striker plate assembly for returning said striker plate from its rotated position to a rest position.

7. The detonator gun as defined by claim 3 wherein:
a substantial portion of the mass of said striker plate assembly is concentrated around its rim to provide a sufficient moment of inertia to ignite said percussion-ignitable delay cap.

8. In seismic sound source system for seismic exploration, an underwater charge launcher including a detonator for igniting a water-propelled explosive charge armed by a percussion-ignitable delay cap and for linearly ejecting said charge into a body of water, the detonator comprising:

an elongated charge ejection barrel having a longitudinal axis, open to the water at one end, for receiving and ejecting a capped charge;

a rotatable, arcuate striker plate assembly having a concave rim, inner and outer faces, a rotational axis perpendicular to the longitudinal ejection-barrel axis, and a firing pin secured to the outer face of said striker plate;

means for supporting said striker plate assembly adjacent the open end of said ejection barrel with said firing pin aligned with the central axis thereof, the concave rim being parallel with said longitudinal axis, the support means further including interior and exterior stop means; and spring means for urging the inner face of said striker plate assembly into contact with said interior stop when said detonator is at rest.

* * * * *